US008408871B2

United States Patent
Herr et al.

(10) Patent No.: US 8,408,871 B2
(45) Date of Patent: Apr. 2, 2013

(54) METHOD AND APPARATUS FOR MEASURING AIR FLOW CONDITION AT A WIND TURBINE BLADE

(75) Inventors: Stefan Herr, Greenville, SC (US); Ryan Michael Leclair, Wilton, NY (US); Christopher Winslow, Schenectady, NY (US); Alexander Simpson, München (DE); Carlos Haertel, München (DE); Thierry Maeder, München (DE)

(73) Assignee: General Electric Company, Schenectady, NY (US)

( * ) Notice: Subject to any disclaimer, the term of this patent is extended or adjusted under 35 U.S.C. 154(b) by 1167 days.

(21) Appl. No.: 12/138,776

(22) Filed: Jun. 13, 2008

(65) Prior Publication Data

US 2009/0311096 A1    Dec. 17, 2009

(51) Int. Cl.
*F01D 7/001* (2006.01)
(52) U.S. Cl. .......................................... 416/37; 415/26
(58) Field of Classification Search ............... 416/42, 416/36, 37; 415/17, 26
See application file for complete search history.

(56) References Cited

U.S. PATENT DOCUMENTS

| 2,101,858 A | 3/1883 | Knisley |
| 2,297,412 A | 11/1939 | Hoppe |
| 3,029,636 A | 5/1955 | Mullins, Jr. |
| 3,638,490 A | 2/1972 | Buettner |
| 3,646,811 A | 3/1972 | DeLeo et al. |
| 4,163,387 A * | 8/1979 | Schroeder ................. 73/178 R |
| 4,901,566 A | 2/1990 | Boetsch et al. |
| 5,205,169 A | 4/1993 | Hagen |
| 5,337,602 A * | 8/1994 | Gibson ..................... 73/182 |
| 5,438,865 A | 8/1995 | Greene |
| 6,131,055 A | 10/2000 | Patrick |
| 6,361,275 B1 | 3/2002 | Wobben |
| 6,461,106 B1 * | 10/2002 | Rahier ..................... 416/1 |
| 6,612,810 B1 | 9/2003 | Olsen et al. |
| 7,347,668 B2 | 3/2008 | Pedersen |
| 7,377,752 B2 | 5/2008 | Mohamed |

(Continued)

FOREIGN PATENT DOCUMENTS

| DE | 197 31 918 A1 | 1/1999 |
| EP | 1 008 921 A1 | 6/2000 |

(Continued)

OTHER PUBLICATIONS

Maeda (Surface Pressure Measurement on a rotating Blade of filed horizontal axis wind turbine in Yawed condition, JSME International Journal, Series B, vol. 48, No. 1, 2005).*

*Primary Examiner* — Matthew W Such
*Assistant Examiner* — Ali Naraghi
(74) *Attorney, Agent, or Firm* — Global Patent Operation; Douglas D. Zhang

(57) ABSTRACT

A method and an apparatus for measuring an air flow at an airfoil surface are provided, wherein at least one pressure sensor adapted to detect an air flow associated with a rotor blade surface and a pressure transducer which converts the detected air flow into an electrical signal indicating the air flow are provided. The pressure sensor is arranged within the boundary layer of the air flow at the airfoil surface such that the boundary layer profile may be determined from the electrical signal. The air flow sensor is adapted for rotor blades of a wind turbine to assist in adjusting a pitch angle of the rotor blades.

17 Claims, 9 Drawing Sheets

U.S. PATENT DOCUMENTS

| | | | |
|---|---|---|---|
| 7,445,431 B2 * | 11/2008 | Larsen et al. | 416/1 |
| 7,883,319 B2 | 2/2011 | Volkmer | |
| 2006/0145483 A1 | 7/2006 | Larsen et al. | |
| 2007/0041834 A1 | 2/2007 | Schram et al. | |
| 2007/0086893 A1 * | 4/2007 | Pedersen | 416/61 |
| 2008/0121752 A1 | 5/2008 | Chen | |
| 2009/0039650 A1 | 2/2009 | Nies | |
| 2009/0097976 A1 * | 4/2009 | Driver et al. | 416/42 |
| 2009/0304505 A1 | 12/2009 | Wobben | |
| 2010/0087960 A1 | 4/2010 | Hayashi et al. | |

FOREIGN PATENT DOCUMENTS

| | | | |
|---|---|---|---|
| EP | 1 288 494 A1 | 3/2003 | |
| EP | 2 017 468 A1 | 1/2009 | |
| GB | 2067247 | * 12/1980 | 416/1 |
| GB | 2067247 A | * 7/1981 | |
| WO | 2005/093435 A1 | 10/2005 | |

* cited by examiner

200

METHOD AND APPARATUS FOR MEASURING AIR FLOW CONDITION AT A WIND TURBINE BLADE

RELATED APPLICATIONS

The present application is related to co-pending patent applications entitled Wind Turbine Inflow Angle Monitoring And Control System, filed the same day as this application, and Wind Turbine Blade Mounted Composite Sensor Support, filed the same day as this application, both related applications incorporated by reference in their entirety.

FIELD OF THE INVENTION

The present invention relates to wind turbines, and especially relates to the measurement of an air flow at a rotor blade of a wind turbine.

BACKGROUND OF THE INVENTION

As wind turbines are of increasing importance as an environmentally safe and relatively inexpensive energy source, the increased demand for improved wind turbine performance has led to efforts concerning an optimum adjustment of the rotor blades of the wind turbine with respect to the incoming air flow. Typically a wind turbine includes a rotor having multiple rotor blades and a hub. The rotor blades may have a considerable size such that the diameter of a large rotor amounts to 30 meters or more. The rotor blades convert wind energy, i.e. an incoming air flow into a rotational torque that is used to drive one or more generators which are rotationally coupled to the rotor through a drive train.

The boundary layer of the air flow at the rotor blade surface and the distribution of the air flow around the surface of the rotor blade is a major issue when the improvement of the energy conversion efficiency of the wind turbine on the whole is concerned. Many attempts have been made to improve the energy conversion efficiency by using models of the air flow around the rotor blades of a wind turbine. These models are derived from simulations and wind tunnel tests under well-defined operating conditions. In the field, however, the rotor blades of wind turbines experience influences from the rotor itself as well as from three-dimensional flow field conditions with turbulence, from side slip, from roughness and degradation changes of the rotor blade surface which are not addressed in the theoretical models. It has been found that the field data are in many cases completely different from predictions with respect to the aerodynamic and acoustic behavior of the turbine blades.

Among the parameters that affect performance and subsequent deviations from model predictions are, most importantly, (i) unexpected inflow conditions with turbulence and side slip, (ii) the accumulation of debris such as insects, dirt, pollen, etc. on the wind turbine rotor blades, and (iii) differences in performance of individual airfoils and rotor blades, respectively. These deviations may lead to considerable differences between a behavior evaluated from the model and the behavior in the field.

SUMMARY OF THE INVENTION

According to a first aspect of the invention, a wind turbine rotor blade is provided, comprising at least one pressure sensor adapted to detect an air flow at or near a rotor blade surface; and a pressure transducer which converts the detected air flow into an electrical signal indicating the air flow.

According to a second aspect of the present invention, a wind turbine comprising a rotor having a plurality of rotor blades and a hub is provided, said wind turbine further comprising a sensor device attached to at least one rotor blade of the wind turbine, said sensor device having at least one pressure side air flow sensor rake attached at a trailing edge of the blade and providing a pressure side sensor signal, and at least one suction side air flow sensor rake attached at the trailing edge of the blade and providing a suction side sensor signal, and a control unit for adjusting operational parameters such as a pitch angle of the at least one rotor blade or the rotor torque demand or the rotations per minute of the rotor as a function of the sensor signals.

According to yet another aspect of the present invention, a method for pitch adjustment of at least one rotor blade of a wind turbine is provided, comprising detecting an inflow air pressure, and adjusting a pitch angle of the at least one rotor blade as a function of the detected inflow air pressure.

Further aspects, advantages and features of the present invention are apparent from the dependent claims, the description and the accompanying drawings.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, wherein.

DETAILED DESCRIPTION OF THE INVENTION

Figure 1:
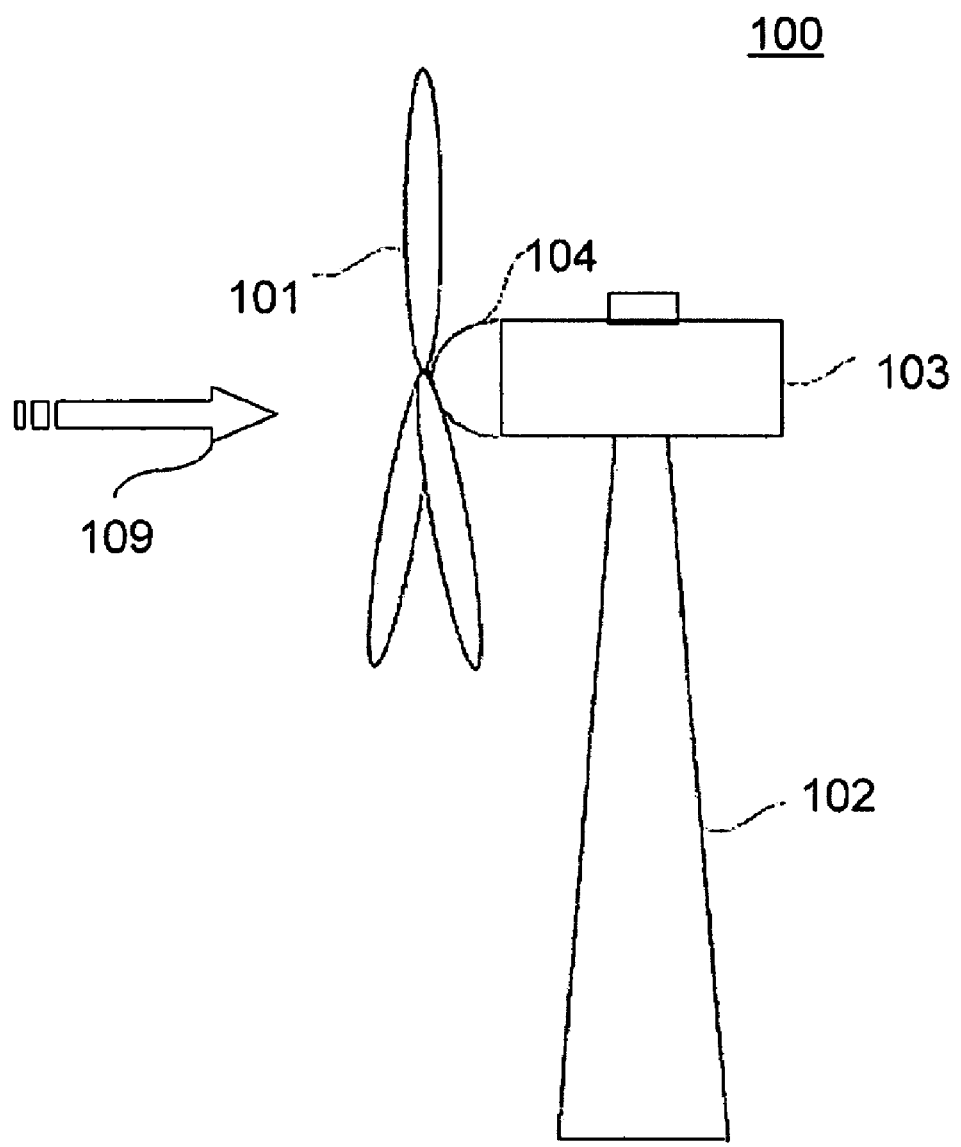
FIG. 1 schematically shows a wind turbine having three rotor blades which may be adjusted with respect to the pitch angle.

Reference will now be made in detail to the various embodiments of the invention, one or more examples of which are illustrated in the figures. Each example is provided by way of explanation of the invention and is not meant as a limitation of the invention. For example, features illustrated or described as part of one embodiment can be used on or in conjunction with other embodiments to yield yet a further embodiment. It is intended that the present invention includes such modifications and variations.

Specifically, a wind turbine is described which has a rotor with a plurality of rotor blades and a hub, wherein the wind turbine also includes a sensor device attached to at least one rotor blade of the wind turbine and a control unit for adjusting a pitch angle of the at least one rotor blade. The measurement of the air flow directly at or near the airfoil (rotor blade cross section) of a wind turbine is required because conventionally wind turbines are adjusted with respect to the pitch angle based on model assumptions.

In view of the above, a blade mounted measurement system is provided which allows the determination of how well the wind turbine blade is performing at any given moment in time. Based on the measurements performed with the blade mounted measurement system, the control schedule of the wind turbine may be adjusted. In worst-case scenario, e.g., this would give means of avoiding the onset of an aerodynamic blade stall. Furthermore, tracking this data over time along with wind direction/magnitude measurements provides useful feedback for the rotor blade design process. An on-line measurement of an aerodynamic performance can advantageously be used to better control turbine blades with increased energy conversion efficiency and a minimized possibility of an aerodynamic blade stall. It is a further advantage of blade mounted measurements which are used to determine the rotor blade aerodynamic performance that the measurement systems can be placed in strategic locations along the length of the rotor blade in order to provide feedback into the control system of the wind turbine.

Expediently, a bundle of measures may be derived and based on on-line measurements performed by the on-board measurement systems, such as (i) warning the controller of an impending aerodynamic blade stall; (ii) determining how best to modify the operational parameters such as a blade pitch of the turbine blade; (iii) assessing the level of contamination built up on the airfoil; and (iv) assessing differences in the performance of individual airfoils (rotor blade cross sections) of the wind turbine in the field.

Advantageously, the state of the air flow surrounding the rotor blade may be measured in order to provide a feedback into the control schedule to ensure optimal performance. It is furthermore an advantage that the measurement system is capable of measuring aerodynamic characteristics such as boundary layer thickness of the air flow over the rotor blade in a variety of operational conditions. By measuring the actual relation between the construction of the rotor blade and the air flow there are assumptions that could lead to errors in the assessment of optimal blade pitch and aerodynamic performance may be eliminated. Furthermore, it is possible to differentiate between the performance of individual rotor blades such that a control schedule can be adjusted accordingly.

FIG. 1 is a schematic view of a wind turbine 100. The wind turbine 100 typically includes a tubular tower 102 (which also may be a lattice tower), a nacelle 103 which is located on top of a tubular tower 102 and which can be rotated about a central axis of the tubular tower 102, and a hub 104. The hub 104 is the central part of a rotor which has three rotor blades 101. Although the wind turbine 100 illustrated in FIG. 1 includes three rotor blades 101, an arbitrary number of rotor 101 blades may be applied to the wind turbine 100. In some configurations, various components are housed in the nacelle 104 atop the tubular tower 102 of the wind turbine 100. In specific configurations, the control system provides control signals to a variable blade pitch drive in order to control the pitch angle of the turbine blades (not shown in FIG. 1). It is noted that the sensor device which is attachable at the rotor blades 101 is not shown in FIG. 1.

Figure 2:
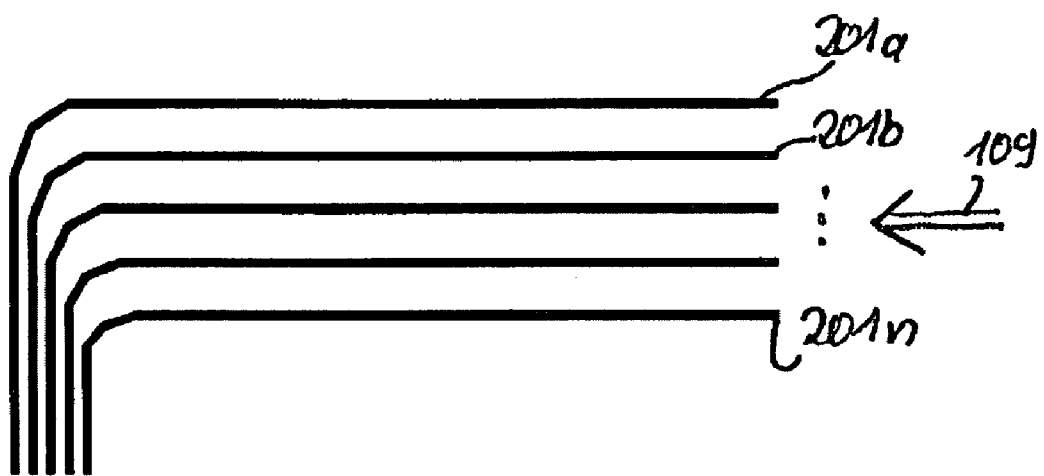
FIG. 2 illustrates a suction side sensor device having five pressure sensors according to an embodiment of the present invention.
Figure 3:
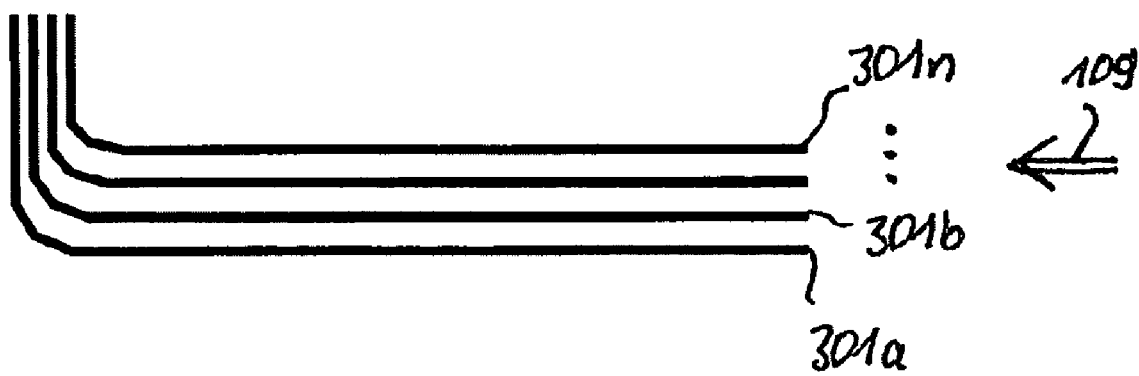
FIG. 3 illustrates a pressure side sensor device having a plurality of pressure sensors according to a second embodiment of the present invention.

FIGS. 2 and 3 respectively illustrate sensor devices which are attached at the trailing edge of a rotor blade. Thus, FIG. 2 exhibits a suction side pressure device 200 including five pressure sensors 201a-201n. It is noted that the number of the pressure sensors is not restricted to five but that any suitable multi-hole pressure probe may be used instead.

FIG. 3 is a pressure side sensor device 300 including a plurality (in this case four) pressure sensors 301a-301n. Again, the number of pressure sensors 301 of the pressure side sensor device 300 is not restricted to the number of 4, but can be any number according to the specific conditions of an application.

In a typical embodiment, the pressure sensors 201, 301 of the suction side sensor side device 200 and the pressure side sensor device 300 are formed as Pitot-static tubes. These Pitot-static tubes serve as air data probes and are designed, e.g. as multi-hole pressure probes. The arrangement of the five pressure sensors 201 of the suction side sensor device 200 and the four pressure sensors 301 of the pressure side sensor device 300 are referred to as sensor rakes, i.e. a suction side sensor rake 200 and a pressure sensor rake 300. The main air flow direction is indicated by an arrow having the reference numeral 109.

It is noted that the measurement system may include any arrangement of sensor devices that can be used to monitor the aerodynamic properties of each individual rotor blade. A boundary layer of the air flow may be measured at and near the surface of the rotor blade 101 at the suction side 108 and the pressure side 107 of the rotor blade 101. The typical parameters to be measured are the boundary layer velocity profiles and the boundary layer thickness is derived from it. Thus, it is advantageous to provide sensor rakes according to FIGS. 2 and 3 such that these rakes reach beyond the boundary layer of the air flow surrounding the rotor blade 101 in order to detect the flow distribution. The sensor rakes 200 and 300 may be positioned such that the boundary layer thickness at critical locations may be measured. A pressure scanner unit may be provided in order to provide a good frequency response of the overall system such that a real time input into a control unit (see FIG. 5) may be provided.

Figure 4:
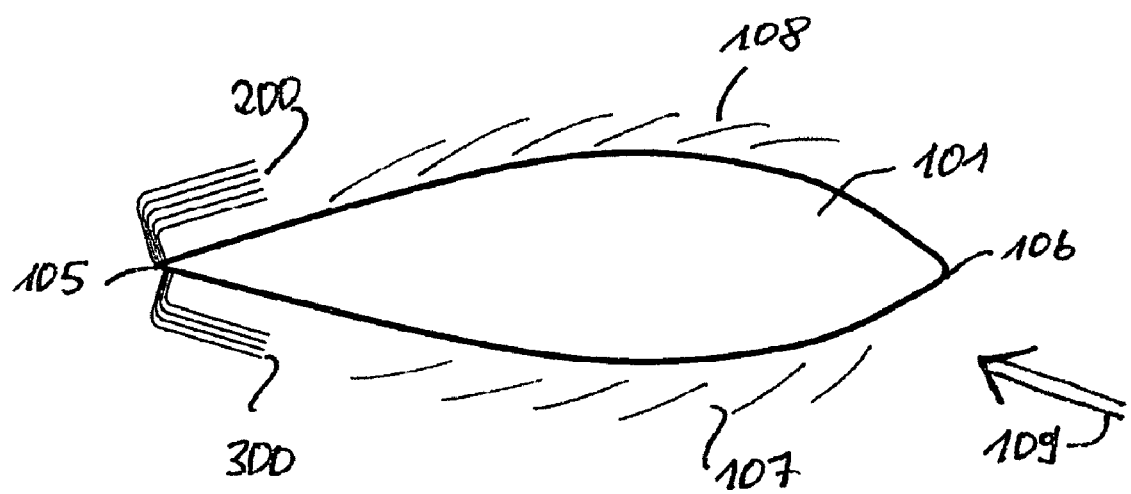
FIG. 4 is a cross-section through a rotor blade of a wind turbine wherein a pressure side sensor device and a suction side sensor device are schematically shown at the trailing edge of the rotor blade.

FIG. 4 is a cross-sectional view of a rotor blade 101 having a sensor device attached at a trailing edge 105 of the rotor blade 101, according to a first embodiment. Reference numeral 109 indicates the main air flow direction (wind direction). Thus, an air flow at a pressure side 107 and at a suction side 108 may be measured by the pressure side sensor device 300 and the suction side sensor device 200, respectively. Reference numeral 106 indicates a leading edge of the rotor blade 101. Using the configuration shown in FIG. 4, it is thus possible to evaluate a velocity distribution around the rotor blade 101. In order to resolve the boundary layer at the pressure side 107 and the suction side 108, respectively, a pressure side sensor device 300 having a narrow spacing of individual pressure sensors 301 may be used, wherein at the suction side 108 the suction side sensor device 200 has a broader spacing of the pressure sensors 301 as compared to the pressure sensors 202 of the suction side sensor device, because at the suction side the boundary layer reaches further into the environment of the airfoil.

Figure 5:
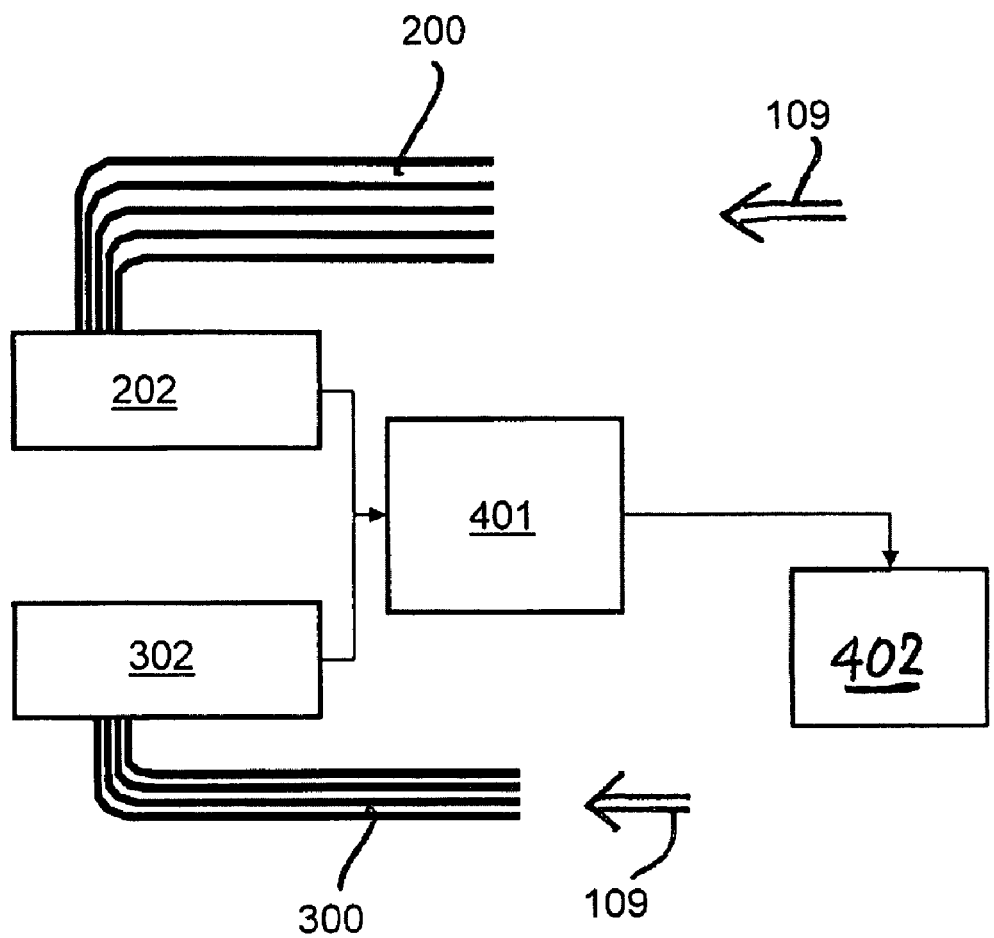
FIG. 5 exhibits a block diagram of a trailing edge sensor system having a pressure side sensor device and a suction side sensor device, a pressure side pressure transducer and a suction side pressure transducer and a control unit and an adjustment unit.

As shown in FIG. 5, the suction side sensor device 200 and the pressure side sensor device 300, which include Pitot-static tubes directed towards the main air flow direction 109, are formed as tubes bent by an angle of 90° towards a pressure transducer 202 and 302, respectively. Thus, a pressure side pressure transducer 302 converts a pressure detected by the pressure sensors 301 into an electrical signal indicating the pressure, wherein the suction side pressure transducer converts a pressure, detected by the pressure sensors 201 of the suction side sensor device into an electrical signal indicating the pressure. The electrical signal is supplied to a control unit 401, respectively, such that the control unit 401 can evaluate an air flow distribution at the pressure side 107 and the suction side 108 of the rotor blade 101 (FIG. 4) by combining multiple signals provided by the individual pressure detection elements. The control unit 401 provides an output which is supplied to an adjustment unit 402 which adjusts a pitch angle of the rotor blades 101. Thus, using the configuration shown in the block diagram of FIG. 5, it is possible to optimize the performance of a wind turbine during an actual operation in the field.

Figure 6:
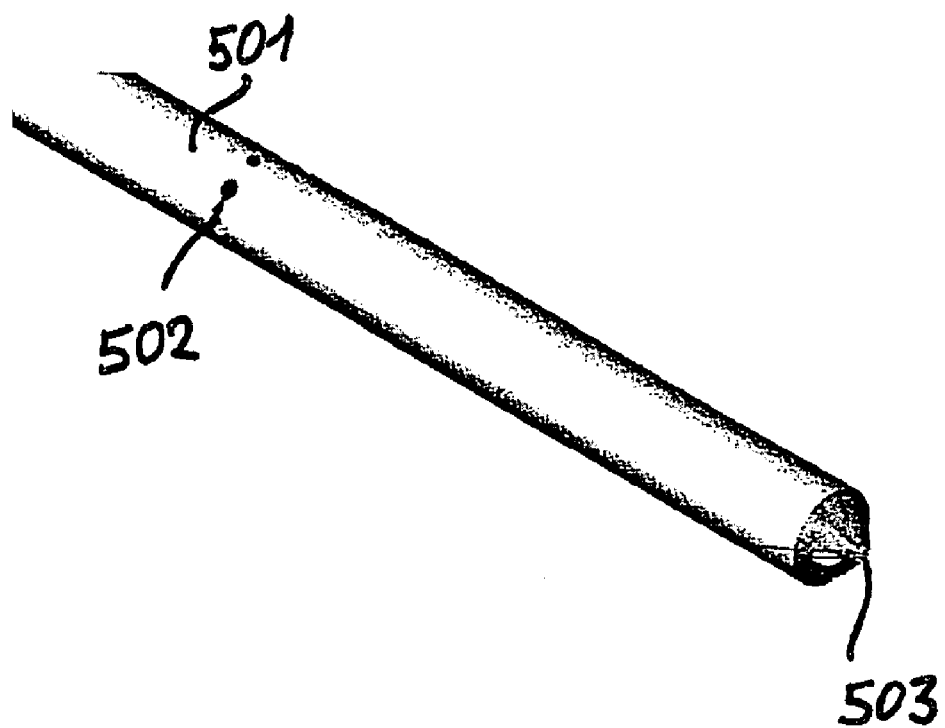
FIG. 6 is an elevation view of a inflow angle pressure sensor attached at the leading edge of a rotor blade, according to a third embodiment of the present invention.

In the following, another embodiment will be described with reference to FIG. 6 to 7. In addition to or alternatively to the first embodiment described with reference to FIG. 1 to 4, this embodiment includes an inflow angle pressure sensor 500 as shown in FIG. 6. This pressure sensor is installed, as opposed to the pressure sensor described above, at a leading edge of the rotor blade 101 of the wind turbine 100. The inflow angle pressure sensor 500 consists of a sensor tube 501 which has first pressure detection holes 502. The number of first pressure detection holes 502 is five in this case, but it is noted that the number is not restricted to five. Furthermore, the inflow angle pressure sensor has a second pressure detection hole 503 at the tip of the pressure sensor 500. The inflow angle pressure sensor 500 may be provided independently of the pressure side and suction side sensor devices described above.

Figure 7:
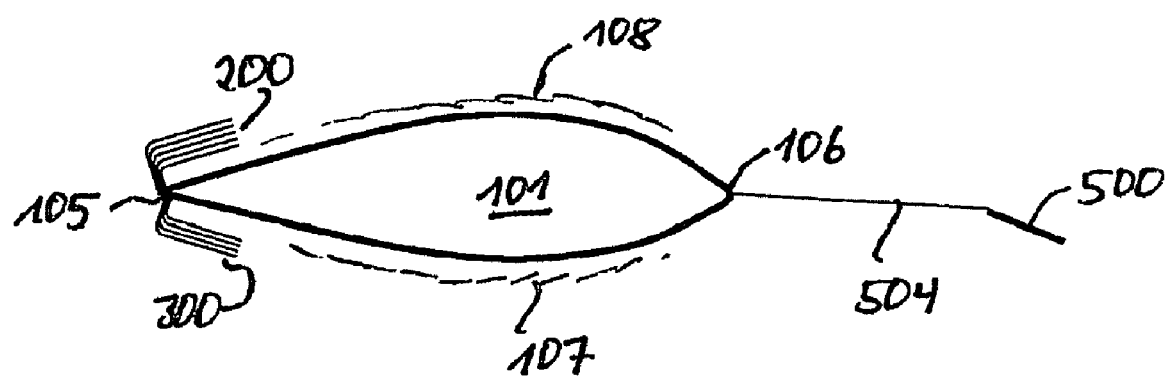
FIG. 7 is a cross-section of a rotor blade according to the cross-section shown in FIG. 4, wherein in addition to the trailing edge sensor devices leading edge sensor devices are attached to the rotor blade.

The inflow angle pressure sensor 500 is installed at the leading edge 106 of the rotor blade 101, as shown in FIG. 7. To this end, the inflow angle pressure sensor 500 is directed towards the supposed main air flow direction. It is nevertheless possible, using the inflow angle pressure sensor 500, to measure different angles of attack due to the construction of the inflow angle pressure sensor 500 with its first pressure detection holes 502 and its second pressure detection hole 503 at the tip thereof. A support structure 504 is provided in order to fix the inflow angle pressure sensor 500 at the leading edge 106 of the rotor blade 101 (FIG. 7). The distance between the leading edge 106 of the rotor blade 101 and the tip of the inflow angle pressure sensor 500 may be, in this specific example given here, as large as 1.3 meters in order to ensure that the measurement by means of the inflow angle pressure sensor is not disturbed by turbulences occurring in the environment of the rotor blade 101. It is noted that the sizes of the various pressure sensors shown in the Figures are not necessarily drawn in scale with respect to the rotor blades 101.

Figure 8:
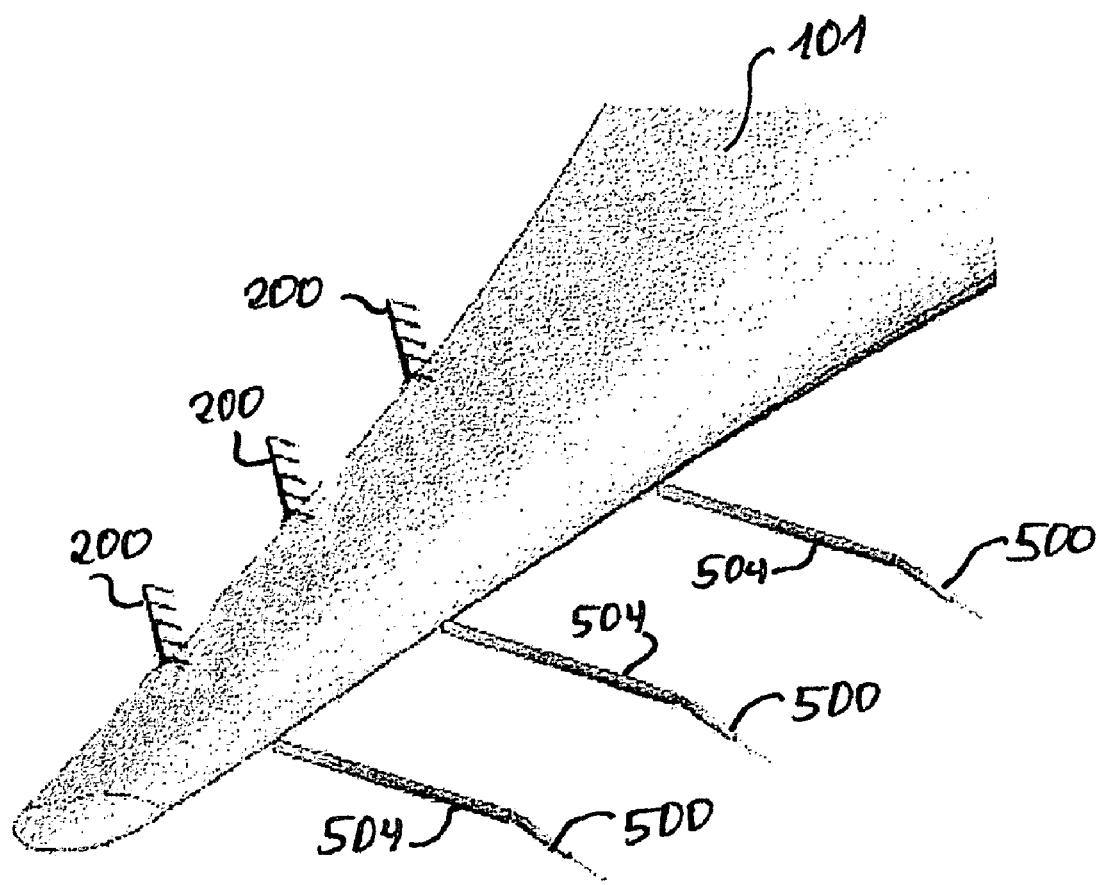
FIG. 8 is an elevation view of outer parts of a rotor blade wherein three stations are equipped with sensor devices.

FIG. 8 is an elevation view of a part of a rotor blade 101 wherein the suction side sensor device (suction side rake) 200 and the inflow angle pressure sensors 500 are installed at three different locations along the length of the rotor blade 101. Although three sensor positions are shown in FIG. 8, it is noted that a different number of sensor positions may be provided along the length of the rotor blade 101 depending on the measurement requirements and the application.

According to an embodiment, the air flow sensor is a Pitot-static tube. Furthermore, a typical configuration of the air flow sensor may be a Pitot-static static tube or another suitable device for dynamic pressure measurement. The profile may be a one-dimensional distribution of the air flow in a line which is oriented perpendicular to the air flow direction and the airfoil surface. Furthermore, it is possible that the profile is a two-dimensional distribution of the air flow in a plane which is oriented perpendicular to the air flow direction.

According to a further embodiment, the air flow sensor includes a heating means for heating the air flow sensor above icing temperature. Typically, the temperature of the air flow sensor amounts to 10° C. to 40° C. It may be advantageous, when the air flow sensor also includes at least one inflow angle sensor attached at a leading edge of the at least one rotor blade. The inflow angle sensor attached at the leading edge of the at least one rotor blade may include a five-hole pressure probe.

According to yet another embodiment, the at least two pressure sensors oriented in a direction towards the air flow exhibit different angles between the axis of the respective pressure sensor and the direction of the air flow.

It is noted that the pressure detection elements which are described above and which are used for the suction side sensor devices, the pressure side sensor devices and the inflow angle pressure detection element may be replaced with other suitable detection elements such as, but not limited to, ultrasonic devices, hot-wire-anemometers, laser topography devices, particle image velocimetry devices, fiber optic devices, etc.

The at least two pressure sensors cooperate with a single pressure transducer. A plurality of pressure sensors may be arranged in a two-dimensional array in order to measure two-dimensional air flow distributions. The air flow sensor rakes may include Pitot-static tubes. A plurality of air flow sensor rakes may be arranged in the form of a two-dimensional array.

According to yet another embodiment, the method for pitch adjustment may include the step of detecting the inflow air pressure distribution by means of the at least two pressure sensors oriented in a direction towards the air flow at a trailing edge of the rotor blade. Additional operational parameters such as the rotor torque demand or the rotations per minute of the rotor may be adjusted as a function of the sensor signals.

According to yet another embodiment, the step of detecting the inflow air pressure distribution includes the step of detecting the inflow air pressure distribution by means of at least two pressure sensors at a pressure side of the trailing edge of the rotor blade and by means of at least two pressure sensors at a suction side of the trailing edge of the rotor blade. Furthermore, it is advantageous to provide an inflow air pressure distribution detection by means of an inflow angle sensor attached at a leading edge of the at least one rotor blade in order to obtain a more accurate detection of a wind profile across the turbine blade.

A two-dimensional inflow air pressure distribution may be detected by means of a plurality of pressure sensors which are arranged in a two-dimensional array.

The pressure transducer converts the detected two-dimensional air pressure distribution into an electrical sensor output signal.

Figure 9:
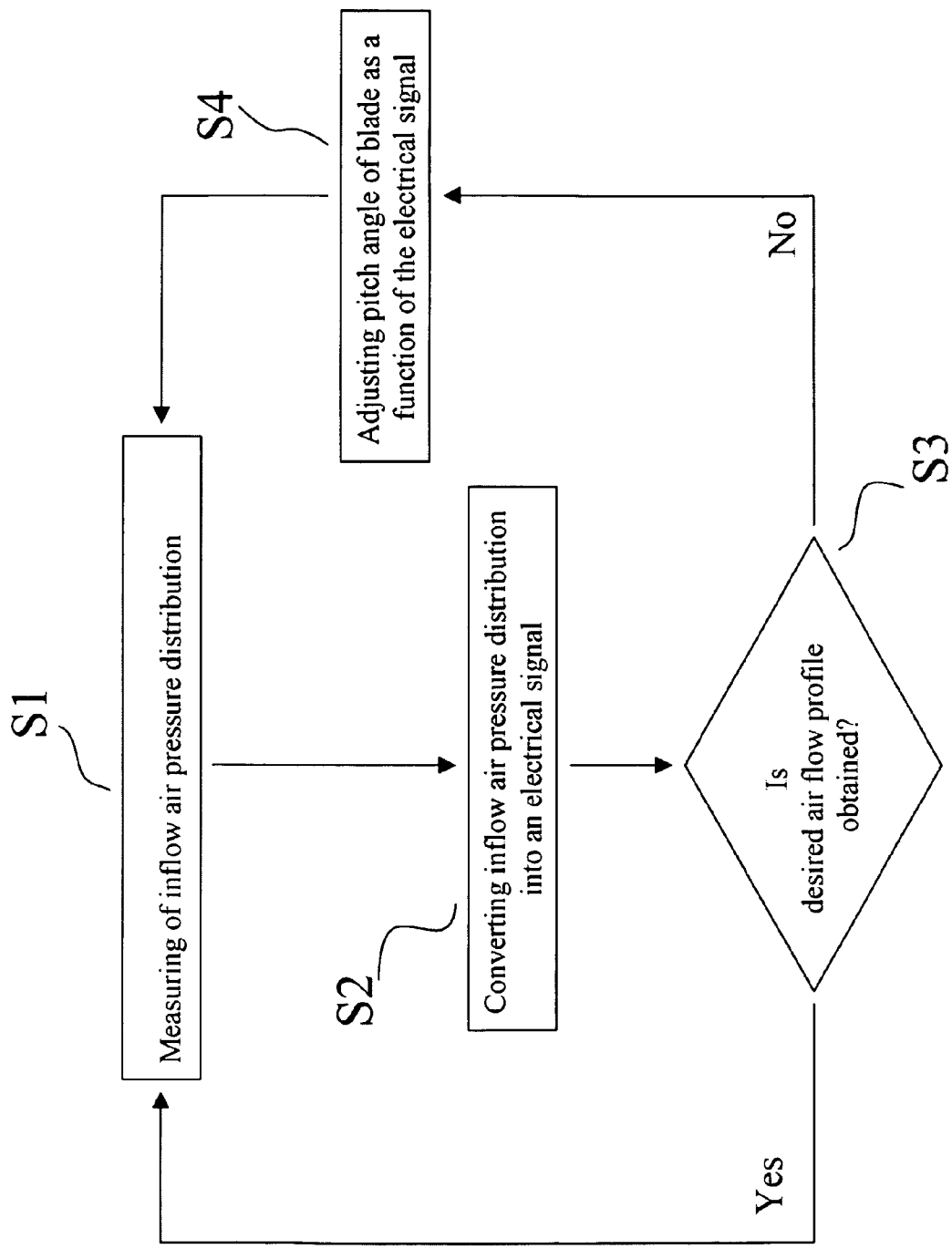
FIG. 9 shows a flow chart for explaining a method for pitch adjustment of a rotor blade.

FIG. 9 is a flow chart illustrating the method for pitch adjustment of at least one rotor blade of a wind turbine. At step S1, the inflow air pressure distribution is measured by sensor devices described above, i.e. a pressure side sensor device 300, a suction side sensor device 200, which are installed at the trailing edge 105 of a rotor blade 101, and by an inflow angle pressure sensor 500 installed at the leading edge 106 of the respective rotor blade 101.

At a step S2, the inflow air pressure distribution measured at step S1 is converted into an electrical signal which represents a profile of the air flow around the surface of the turbine blade (airfoil). This conversion is carried out by means of a pressure transducer. Using the electrical signal the pitch angle of the at least one rotor blade can be adjusted by means of a control unit such that a predeterminable air flow profile around the rotor blade of the wind turbine is obtained.

Then, at a step S4, it is determined whether a desired air flow profile has been obtained or not. Whether the desired air flow profile is obtained or not may be determined by a combination of the sensor signals of the suction side sensor device, the pressure side sensor device and/or the inflow angle pressure sensor. If it is determined at step S4 that the desired air flow profile is not obtained (NO), the angle of the respective blade (or the respective blades) is (are) adjusted as a function of the electrical signal in step S5. The procedure continues with measuring a new inflow air pressure distribution in step S1 and the procedural steps S2 and S3 are repeated.

When it is determined at step S4 that the desired air flow profile has been obtained (YES), the procedure directly continues with measuring a new inflow air pressure distribution in step S1 and the procedural steps S2 and S3 are repeated.

This written description uses examples to disclose the invention, including the best mode, and also to enable any person skilled in the art to make and use the invention. While the invention has been described in terms of various specific embodiments, those skilled in the art will recognize that the invention can be practiced with modification within the spirit and scope of the claims. Especially, mutually non-exclusive features of the embodiments described above may be combined with each other. The patentable scope of the invention is defined by the claims and may include other examples that occur to those skilled in the art. Such other examples are intended to be within the scope of the claims if they have structural elements that do not differ from the literal language of the claims or if they include equivalent structural elements with insubstantial differences from the literal languages of the claims.

What is claimed is:

1. A wind turbine rotor blade comprising:
    a pressure sensor positioned a distance away from a surface of the blade and configured to detect a characteristic of a boundary layer of an air flow associated with the surface of the rotor blade; and
    a pressure transducer which converts the detected characteristic into an electrical signal indicating the characteristic.

2. The wind turbine rotor blade in accordance with claim 1, wherein at least two pressure sensors are arranged in a row substantially along a line perpendicular to the surface of the rotor blade, and wherein each sensor is oriented in a direction towards the air flow for detecting an air pressure distribution.

3. The wind turbine rotor blade in accordance with claim 2, wherein the at least two pressure sensors are arranged within the boundary layer of the air flow wherein a boundary layer profile, the profile being perpendicular to the air flow associated with the surface of the rotor blade, can be determined from the electrical signal.

4. The wind turbine rotor blade in accordance with claim 1, wherein the pressure sensor comprises a Pitot-static tube.

5. The wind turbine rotor blade in accordance with claim 1, wherein the characteristic comprises a one-dimensional distribution of the air flow in a line which is oriented perpendicular to both the air flow direction and the surface of the rotor blade.

6. The wind turbine rotor blade in accordance with claim 1, wherein the characteristic comprises a two-dimensional distribution of the air flow in a plane which is oriented perpendicular to the air flow direction.

7. The wind turbine rotor blade in accordance with claim 1, wherein the pressure sensor further comprises a heater for heating the pressure sensor above icing temperature.

8. The wind turbine rotor blade in accordance with claim 1, wherein the pressure sensor comprises three or more pressure sensor devices arranged in a two-dimensional array, wherein each pressure sensor device lies substantially in a plane which is oriented perpendicular to the air flow.

9. The wind turbine rotor blade in accordance with claim 1, wherein the characteristics of the boundary layer comprise at least one of boundary layer velocity profiles and a boundary layer thickness.

10. The wind turbine rotor blade in accordance with claim 1, wherein the pressure sensor comprises an array of pressure sensor devices, each pressure sensor device in the array being positioned at a different distance away from the surface of the rotor blade.

11. A wind turbine rotor blade comprising:
    at least one inflow angle sensor attached at a leading edge of the rotor blade and configured to detect an air flow associated with the rotor blade leading edge;
    at least one sensor rake attached at a trailing edge of the rotor blade, the sensor rake comprising a plurality of sensors arranged at a plurality of distances away from a surface of the rotor blade and configured to detect characteristics of a boundary layer of an air flow associated with the surface of the rotor blade;
    at least one pressure transducer which converts the detected air flow associated with the leading edge into an electrical signal indicating the inflow angle, and converts the detected characteristics into an electrical signal indicating the characteristics.

12. The wind turbine rotor blade in accordance with claim 11, wherein the at least one inflow angle sensor attached at a leading edge of the rotor blade comprises a multi-hole pressure probe.

13. The wind turbine rotor blade in accordance with claim 11, wherein the characteristics of the boundary layer comprise at least one of boundary layer velocity profiles and a boundary layer thickness.

14. A wind turbine comprising a rotor having a plurality of rotor blades and a hub, said wind turbine further comprising:
    a sensor device attached to at least one rotor blade of the plurality of rotor blades of the wind turbine, said sensor device comprising:
        at least one pressure side air flow sensor rake attached at a trailing edge of the at least one rotor blade and providing a pressure side sensor signal; and
        at least one suction side air flow sensor rake attached at the trailing edge of the at least one rotor blade and providing a suction side sensor signal; and
    a controller that is configured to adjust a pitch angle of the at least one rotor blade as a function of the sensor signals, wherein each air flow sensor rake comprises a plurality of sensors arranged at a plurality of distances away from a side of the at least one rotor blade and configured to detect characteristics of a boundary layer of an air flow associated with the side of the at least one rotor blade.

15. The wind turbine in accordance with claim 14, wherein the air flow sensor rake comprises Pitot-static tubes.

16. The wind turbine in accordance with claim 14, wherein the air flow sensor rake comprises a plurality of air flow sensor rakes arranged in a two-dimensional array oriented substantially-perpendicular to the air flow.

17. A wind turbine comprising a rotor having a plurality of rotor blades and a hub, said wind turbine further comprising:
- a sensor device attached to at least one rotor blade of the plurality of rotor blades of the wind turbine, said sensor device being configured to provide at least one sensor signal; and
- a control unit for adjusting a pitch angle of the at least one rotor blade as a function of the at least one sensor signal, wherein the sensor device comprises:
    - at least one inflow angle sensor attached at a leading edge of the at least one rotor blade and configured to provide an inflow angle sensor signal;
    - at least one air flow sensor rake attached at the trailing edge of the at least one rotor blade and configured to provide a side airflow sensor signal,
- wherein each air flow sensor rake comprises a plurality of sensors arranged at a plurality of distances away from a side of the at least one rotor blade and configured to detect characteristics of a boundary layer of an air flow associated with the side of the at least one rotor blade.

* * * * *